United States Patent
Sugawara

(10) Patent No.: US 11,332,023 B2
(45) Date of Patent: May 17, 2022

(54) STRADDLED VEHICLE

(71) Applicant: YAMAHA HATSUDOKI KABUSHIKI KAISHA, Iwata (JP)

(72) Inventor: Kohei Sugawara, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 190 days.

(21) Appl. No.: 16/931,070

(22) Filed: Jul. 16, 2020

(65) Prior Publication Data

US 2021/0031637 A1    Feb. 4, 2021

(30) Foreign Application Priority Data

Jul. 30, 2019    (JP) .............................. JP2019-140194

(51) Int. Cl.
| | | |
|---|---|---|
| *B60L 50/60* | (2019.01) | |
| *B62J 45/42* | (2020.01) | |
| *B62J 45/414* | (2020.01) | |
| *B62K 11/04* | (2006.01) | |

(52) U.S. Cl.
CPC ............... *B60L 50/66* (2019.02); *B62J 45/42* (2020.02); *B60Y 2200/12* (2013.01); *B62J 45/414* (2020.02); *B62K 11/04* (2013.01)

(58) Field of Classification Search
CPC ..... B62J 45/42; B62J 45/414; B60Y 2200/12; B62K 11/04; B60L 50/66
See application file for complete search history.

(56) References Cited

U.S. PATENT DOCUMENTS

| | | | | | |
|---|---|---|---|---|---|
| 5,460,234 | A | * | 10/1995 | Matsuura | B60L 15/20 180/68.5 |
| 8,820,416 | B2 | * | 9/2014 | Holderman | E21B 34/063 166/373 |
| 8,833,495 | B2 | * | 9/2014 | Iwata | B60K 1/04 180/68.5 |

(Continued)

FOREIGN PATENT DOCUMENTS

| | | |
|---|---|---|
| CN | 103569267 A | 2/2014 |
| EP | 3486155 A1 | 5/2019 |

(Continued)

OTHER PUBLICATIONS

Office Action in the couterpart Chinese patent application (202010743489.7) dated Jul. 22, 2021.

(Continued)

*Primary Examiner* — Tony H Winner
(74) *Attorney, Agent, or Firm* — Rabin & Berdo, P.C.

(57) ABSTRACT

A straddled vehicle includes a body frame, a seat, a battery case storing a battery and inertial measurement unit, a drive wheel. The battery case is provided such that its bottom portion protrudes toward the position between the rear suspension and the rear wheel. The inertial measurement unit is fixed to the bottom portion of the battery case at a position above the inertial measurement unit. The bottom portion of the battery case is located in a space other than a space in which the rear suspension and the drive wheel are positioned when the rear suspension is in a most contracted state due to absorbance of shock. At least the battery and the inertial measurement unit partially overlap each other in a plan view of the vehicle.

12 Claims, 8 Drawing Sheets

(56) References Cited

U.S. PATENT DOCUMENTS

| | | | | |
|---|---|---|---|---|
| 8,862,296 | B2* | 10/2014 | Kurakawa | B60K 1/04 |
| | | | | 701/22 |
| 10,011,323 | B2* | 7/2018 | Inoue | B60L 50/66 |
| 10,637,024 | B2* | 4/2020 | Suzuki | B60R 16/04 |
| 2014/0292075 | A1* | 10/2014 | Matsuda | B62J 43/20 |
| | | | | 307/9.1 |
| 2015/0122563 | A1* | 5/2015 | Kondo | H01M 10/625 |
| | | | | 180/68.5 |
| 2017/0282818 | A1* | 10/2017 | Usa | B62L 1/00 |
| 2018/0339584 | A1* | 11/2018 | Chen | B62J 43/30 |
| 2020/0385079 | A1* | 12/2020 | Ueno | B60K 1/04 |

FOREIGN PATENT DOCUMENTS

| | | |
|---|---|---|
| EP | 3486156 A1 | 5/2019 |
| JP | 2017-013731 A | 1/2017 |
| JP | 2018135092 A | 8/2018 |
| TW | 201919932 A | 6/2019 |
| WO | 2019064951 A1 | 4/2019 |

OTHER PUBLICATIONS

Office Action in the couterpart Taiwan patent application (109123816) dated Apr. 8, 2021.

* cited by examiner

STRADDLED VEHICLE

CROSS-REFERENCE TO RELATED APPLICATIONS

This application is based upon and claims the benefit of priority of the prior Japanese Patent Application No. 2019-140194, filed on Jul. 30, 2019, the entire contents of which are incorporated herein by reference.

BACKGROUND OF THE INVENTION

Field of the Invention

The present invention relates to a saddled vehicle including an inertial measurement unit.

Description of Related Art

An ABS (Antilock Brake System) may be provided in a motorcycle. An IMU (Inertial Measurement Unit) is used to control the ABS, for example. In the following description, the IMU is suitably referred to as an inertial sensor.

The inertial sensor includes an acceleration sensor, and detects acceleration exerted on the vehicle provided with the inertial sensor in the directions of three axes orthogonal to one another. Further, the inertial sensor includes a gyro sensor, and detects an angular velocity generated around each of the above-mentioned three axes in regard to the vehicle provided with the inertial sensor. The ABS is controlled based on at least part of a plurality of accelerations and a plurality of angular velocities detected by the inertial sensor. Thus, the braking force exerted on a front wheel or a rear wheel is adjusted according to a traveling state of the vehicle.

In a case where the inertial sensor is provided in the motorcycle, vibration generated from an engine may be transmitted to the inertial sensor depending on the attachment state of the inertial sensor. Further, vibration caused by the vertical movement of the front wheel or the rear wheel may be transmitted to the inertial sensor depending on the state of the road surface on which the motorcycle travels. The vibration reduces the detection accuracy of acceleration and an angular velocity by the inertial sensor.

As such, the configuration for reducing various types of vibration transmitted to the inertial sensor in the motorcycle has been proposed. For example, in the attachment structure of an inertial sensor described in JP 2017-13731 A, a floating bracket is fixed to a body frame via a vibration absorbing member. In this state, the inertial sensor is attached to a first attachment surface of the floating bracket, and an ABS unit is attached to a second attachment surface of the floating bracket.

BRIEF SUMMARY OF THE INVENTION

However, even in a case where the structure described in JP 2017-13731 A is applied, the detection accuracy of acceleration and an angular velocity by the inertial sensor may be reduced. Specifically, in the motorcycle described in JP 2017-13731 A, the inertial sensor is provided while being exposed to the outside of the motorcycle. Therefore, rainwater and dust are likely to adhere to the inertial sensor during traveling of the vehicle. The adherence of rainwater and dust to the inertial sensor may reduce the detection accuracy of inertia by the inertial sensor.

Further, in a case where the inertial sensor is located at a position where the inertial sensor is easily accessed from outside of the motorcycle, the position or orientation of the inertial sensor may be erroneously changed by a user of motorcycle. With the structure described in JP 2017-13731 A, the inertial sensor is attached to a plate-shaped floating bracket and fixed to the body frame while being exposed. Therefore, in the motorcycle described in JP 2017-13731 A, it can be said that the inertial sensor is relatively easily accessible from outside of the motorcycle. The position and orientation of the inertial sensor in the motorcycle are defined so as to comply with the conditions designed in advance. Therefore, in a case where the position and orientation of the inertial sensor provided in the motorcycle are changed after the motorcycle is shipped from the factory, the acceleration and angular velocity to be detected are not detected.

Further, it is generally desirable to miniaturize a motorcycle. Therefore, no wasteful space is essentially provided in the motorcycle. Therefore, in a case where an electric appliance such as an inertial sensor is added to the motorcycle, it is necessary to secure a new installation space for installing the additional electric appliance. In this case, the size of the motorcycle is increased.

An object of the present invention is to provide a straddled vehicle enlargement of which to be caused by provision of an inertial measurement unit can be suppressed while high detection accuracy of inertia by the inertial measurement unit can be maintained.

Generally, a motorcycle is provided with a battery case that stores a battery. As such, in regard to the above-mentioned problem, the inventor of the present invention considered that it was possible to prevent the inertial measurement unit from being exposed to outside and increase difficulty in accessing the inertial measurement unit from outside of the motorcycle in a case where the inertial measurement unit was arranged in the battery case together with the battery. However, if the size of the battery case is increased for arranging the inertial measurement unit in the battery case, the height of a seat increases due to an increase in size of the battery case.

Further, the battery case is fixed to the body frame. The inertial measurement unit is smaller in weight than a battery, a hydraulic unit used for an ABS, and the like. Therefore, in a case where being fixed to the battery case, the inertial measurement unit is likely to vibrate together with an attachment portion of the battery case due to vibration transmitted from an engine, a front wheel or a rear wheel through the body frame.

As described above, in regard to the configuration for arranging the inertial measurement unit in the battery case together with the battery, the inventor of the present invention has encountered a new problem of an increase in height of the seat and vibration of the inertial measurement unit.

In regard to these points, the inventor of the present invention has noticed that there was a dead space between a rear suspension and a rear wheel in a vehicle front-and-rear direction and in a region in the vicinity thereof as a result of repeated examination. Thus, the inventor of the present invention has discovered that it was possible to arrange the inertial measurement unit in the battery case without an increase in height of the seat if this dead space could be effectively utilized as a space for installing the inertial measurement unit.

Further, the inventor of the present invention has noticed that vibration was unlikely to be transmitted from outside to the portion of the battery case to which the battery was fixed and the vicinity thereof due to the weight of the battery. As such, the inventor of the present invention has discovered that vibration generated in the inertial measurement unit could be reduced by the weight of the battery if the inertial measurement unit was fixed in the vicinity of the portion to which the battery was fixed in the battery case.

The inventor of the present invention has arrived at the present invention described below as a result of the series of above-mentioned examination.

(1) A straddled vehicle according to one aspect of the present invention includes a body frame, a seat that is arranged above the body frame and supported at the body frame, a battery, an inertial measurement unit, a resin battery case that stores the battery and the inertial measurement unit, and is fixed to the body frame to be located below the seat, a rear arm provided to extend rearwardly from the body frame, a drive wheel rotatably supported by the rear arm, and a rear suspension that is provided at a position farther forward than the drive wheel to extend obliquely downwardly from a position forward of the vehicle to a position rearward of the vehicle, and supports the rear arm at the body frame to be swingable in a vehicle up-and-down direction, wherein the battery case has a bottom portion that protrudes toward a position between the rear suspension and the drive wheel in a vehicle front-and-rear direction so as not to overlap with the rear suspension and the drive wheel in a side view of the vehicle while being most contracted due to absorbance of shock by the rear suspension, the inertial measurement unit is fixed to the bottom portion of the battery case, and the battery is fixed to the battery case at a position above the inertial measurement unit to overlap with at least part of the inertial measurement unit in a plan view of the vehicle.

In the straddled vehicle, the battery case is fixed to the body frame below the seat. The battery and the inertial measurement unit are stored in the battery case. The bottom portion of the battery case protrudes toward a position between the rear suspension and the drive wheel in the vehicle front-and-rear direction. With such a configuration, the battery case has high rigidity despite being formed of resin.

The inertial measurement unit is fixed to the bottom portion of the battery case, whereby the dead space that is outside of the range of motion of the rear suspension and the range of motion of the drive wheel is effectively utilized as a space for installing the inertial measurement unit. Therefore, the inertial measurement unit can be arranged in the battery case without an increase in height of the seat.

Further, with the above-mentioned configuration, the battery is fixed to the battery case at a position above the inertial measurement unit so as to overlap with at least part of the inertial measurement unit in the plan view of the vehicle. In this case, the portion to which the battery is attached is in close proximity to the other portion to which the inertial measurement unit is attached in the battery case. Thus, even in a case where vibration is transmitted from the body frame to the battery case during traveling of the vehicle, vibration of the portion to which the inertial measurement unit is attached in the battery case is suppressed due to the weight of the battery. Further, because being made of resin, the above-mentioned battery case absorbs part of vibration transmitted from the body frame. Therefore, vibration generated in the inertial measurement unit is reduced.

Further, with the above-mentioned configuration, the battery and the seat are present above the inertial measurement unit. This increases the difficulty of accessing the inertial measurement unit from outside of the straddled vehicle.

Further, because the inertial measurement unit is provided inside of the battery case, rainwater or dust that is scattered outside of the straddled vehicle during traveling of the vehicle is prevented from adhering to the inertial measurement unit.

As a result, an increase in size of the vehicle due to provision of the inertial measurement unit can be suppressed while high detection accuracy of inertia by the inertial measurement unit is maintained.

(2) The battery may be fixed to overlap with the entire inertial measurement unit in the plan view of the vehicle. Thus, the difficulty in accessing the inertial measurement device from outside of the straddled vehicle is further increased.

(3) A distance between the battery and the inertial measurement unit may be smaller than a half of thickness of the battery in a vehicle up-and-down direction.

In this case, the portion to which the battery is attached becomes closer to the other portion to which the inertial measurement unit is attached in the battery case. Thus, the vibration of the other portion to which the inertial measurement unit is attached in the battery case is further suppressed due to the weight of the battery.

Further, it is not necessary to ensure the large installation space for the battery and the inertial measurement unit in a vehicle up-and-down direction. This can suppress an increase in size of the battery case in the vehicle up-and-down direction, whereby an increase in height of the seat can be suppressed.

(4) The straddled vehicle may further include a hydraulic unit that is stored in the battery case and is fixed to the battery case to be adjacent to the battery.

In this case, the hydraulic unit is fixed to the battery case to be adjacent to the battery. Thus, the vibration generated in the vicinity of the inertial measurement unit in the battery case is reduced by the weight of the battery and the hydraulic unit. Further, because the hydraulic unit is stored in the battery case, an increase in height of the seat due to provision of the hydraulic unit outside of the battery case is suppressed.

(5) The inertial measurement unit may be fixed to the bottom portion of the battery case via a first shock buffering member.

In this case, transmission of the vibration generated in the battery case due to traveling of the vehicle to the inertial measurement unit is suppressed. Thus, the inertia of the vehicle can be measured with high accuracy.

(6) The battery case may be fixed to the body frame via a second shock buffering member.

In this case, transmission of the vibration generated in the body frame due to traveling of the vehicle to the battery case is suppressed. Thus, the inertia of the vehicle can be measured with higher accuracy.

(7) The inertial measurement unit may be arranged to overlap with a vehicle central axis extending in the vehicle front-and-rear direction in the plan view of the vehicle. Thus, the inertia of the vehicle can be measured more accurately.

(8) The inertial measurement unit may be fixed in the battery case so as not to be inclined with respect to a horizontal plane by 15° or larger with the vehicle vertically standing up. Thus, the inertia of the vehicle can be measured more accurately.

(9) The straddled vehicle may further include a metallic fixing mechanism that is attached to the battery case, and is configured to be able to fix the battery to the battery case and detach the battery from the battery case.

In this case, the battery is firmly fixed to the battery case as compared to the case where the battery is fixed to the battery case by an elastic member such as rubber. Thus, generation of vibration in the bottom portion of the battery case due to movement of the battery with respect to the battery case during traveling of the vehicle is suppressed. As a result, the inertia of the vehicle can be measured more accurately.

(10) The battery may have a first surface and a second surface adjacent to each other, the fixing mechanism may include a first fixing member having a first end and a second end, and a second fixing member having a third end and a fourth end, the second end of the first fixing member may be connected to the third end of the second fixing member by a hinge, the first end of the first fixing member may be attached to the battery case such that the first fixing member extends along the first surface of the battery, the second fixing member may be provided to be able to be come close to and move away from the second surface of the battery by rotating with respect to the first fixing member with use of the hinge, and the fourth end of the second fixing member may be configured to be fixable to and detachable from the battery case with the second fixing member being in close proximity to the second surface of the battery.

In this case, the battery can be easily and firmly fixed to the battery case by the first fixing member and the second fixing member. Further, the battery fixed to the battery case can be easily removed.

(11) The straddled vehicle may further include an operation element that performs an operation in regard to the vehicle, and a controller that controls the operation element based on a result of inertial measurement of the vehicle by the inertial measurement unit. Thus, the operation relating to the vehicle is appropriately controlled according to the state of the vehicle.

Other features, elements, characteristics, and advantages of the present invention will become more apparent from the following description of preferred embodiments of the present invention with reference to the attached drawings.

DETAILED DESCRIPTION OF THE INVENTION

A straddled vehicle according to one embodiment of the present invention will be described below with reference to the drawings. A motorcycle will be described as one example of the straddle vehicle.

[1] Schematic Configuration of Motorcycle

Figure 1:
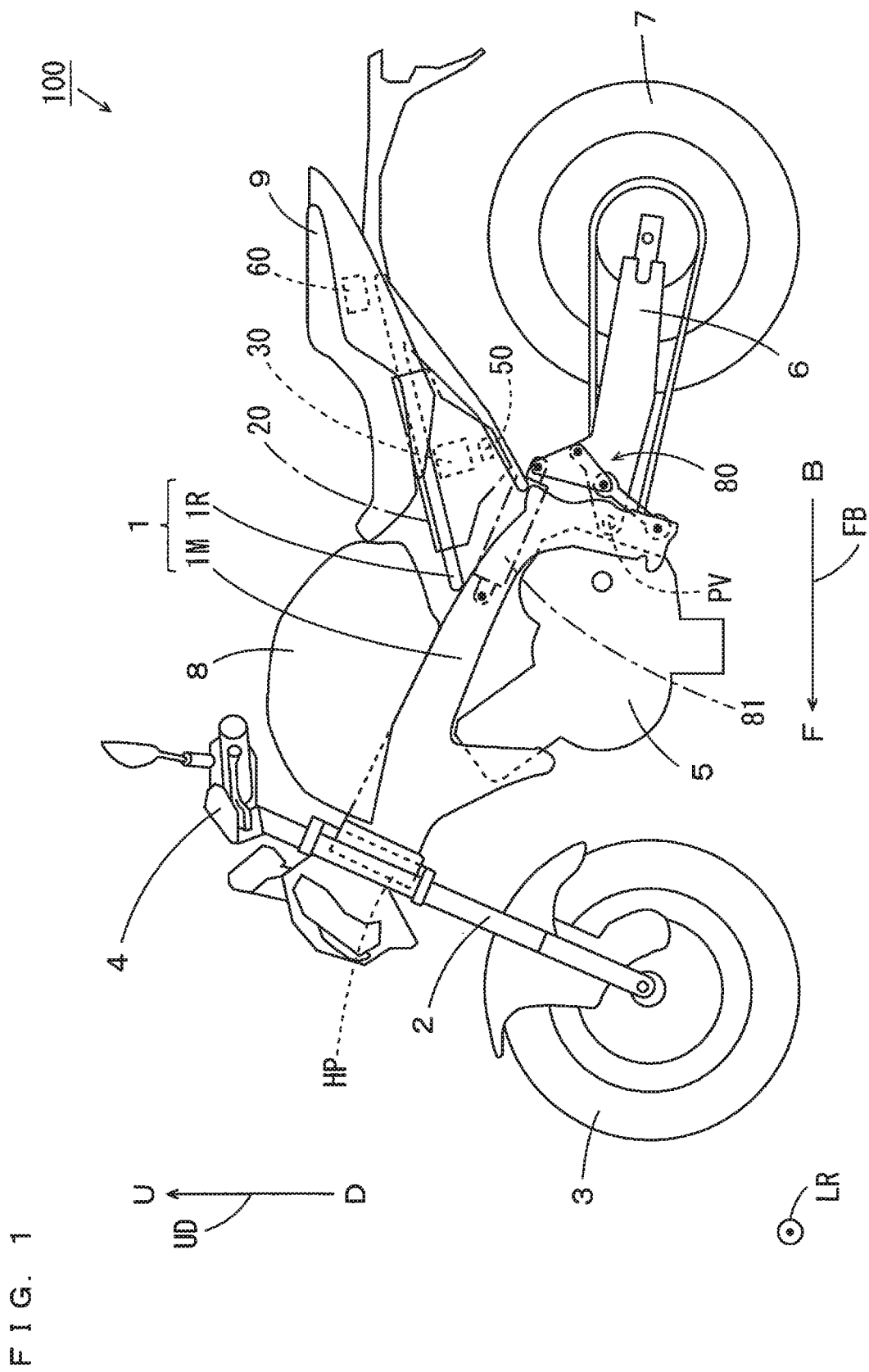
FIG. 1 is a side view of a motorcycle according to one embodiment of the present invention.

FIG. 1 is a side view of the motorcycle according to the one embodiment of the present invention. FIG. 1 shows the motorcycle 100 standing up to be perpendicular to the road surface. In each of FIG. 1 and subsequent given diagrams, a front-and-rear direction FB, a left-and-right direction LR and a up-and-down direction UD of the motorcycle 100 are indicated by arrows. The direction in which an arrow is directed in the front-and-rear direction FB is referred to as forward, and its opposite direction is referred to as rearward. Further, the direction in which an arrow is directed in the left-and-right direction LR is referred to as leftward, and its opposite direction is referred to as rightward. Further, the direction in which an arrow is directed in the up-and-down direction UD is referred to as upward, and its opposite direction is referred to as downward. In each of FIG. 1 and subsequent given diagrams, forward, rearward, leftward, rightward, upward and downward are indicated by reference characters F, B, L, R, U and D, respectively.

The motorcycle 100 of FIG. 1 includes a metallic body frame 1. The body frame 1 includes a main frame 1M and a rear frame 1R. The front end of the main frame 1M constitutes a head pipe HP. The main frame 1M is formed to extend rearwardly and downwardly from the head pipe HP. The rear frame 1R is attached to the main frame 1M so as to extend rearwardly and slightly upwardly from the rear end and the vicinity of the rear end of the main frame 1M.

A front fork 2 is provided at the head pipe HP to be swingable in the left-and-right direction LR. A front wheel 3 is rotatably supported at the lower end of the front fork 2. A handle 4 is provided at the upper end of the front fork 2.

The main frame 1M supports an engine 5 at a position farther downward than the head pipe HP. A fuel tank 8 is provided to be located upwardly of the engine 5 and rearwardly of the head pipe HP. A seat 9 is provided rearwardly of the fuel tank 8. The fuel tank 8 is supported by the main frame 1M and located above the main frame 1M. A seat 9 is mainly supported by the rear frame 1R and is located above the rear frame 1R.

A rear arm 6 is provided to extend rearwardly from the lower rear end of the main frame 1M. The rear arm 6 is supported by the main frame 1M via a pivot shaft PV. A rear wheel 7 is rotatably supported at the rear end of the rear arm 6. The rear wheel 7 is rotated by the motive power generated by the engine 5 as a drive wheel.

A shock-absorbing mechanism 80 for absorbing shock transmitted from the rear wheel 7 to the rear arm 6 during traveling of the vehicle is provided in the rear half of the main frame 1M. The shock-absorbing mechanism 80 includes a rear suspension 81. Details of the shock-absorbing mechanism 80 will be described below.

A resin battery case 20 is fixed to the rear frame 1R so as to be located below the seat 9. The battery case 20 stores a battery 30 for supplying electrical power to an electrical system of the motorcycle 100. Further, the battery case 20 stores an IMU (Inertial Measurement Unit) 50. In the following description, the IMU is referred to as an inertial sensor.

The inertial sensor 50 includes an acceleration sensor, and measures acceleration exerted on the motorcycle 100 in directions of three axes orthogonal to one another. Further, the inertial sensor 50 includes a gyro sensor, and measures an angular velocity generated around each of the above-mentioned three axes as a traveling state of the motorcycle 100. Further, the inertial sensor 50 outputs the results of these measurements.

An ECU (Electronic Control Unit) 60 is further provided below the seat 9. The ECU 60 may or may not be stored in the battery case 20. The ECU 60 controls various operation elements in the motorcycle 100 based on the results of various measurements output from the inertial sensor 50.

For example, the motorcycle 100 according to the present embodiment is provided with an ABS (Antilock Brake System). The ABS is mainly constituted by a master cylinder, a caliper and a hydraulic unit. In this case, the ECU 60 controls an operation of the hydraulic unit 70 (see FIG. 4, described below) of the ABS based on the results of various measurements output from the inertial sensor 50. Thus, the ABS is appropriately controlled according to a state of the vehicle.

[2] Attachment State of Inertial Sensor 50 in Motorcycle 100

Figure 2:
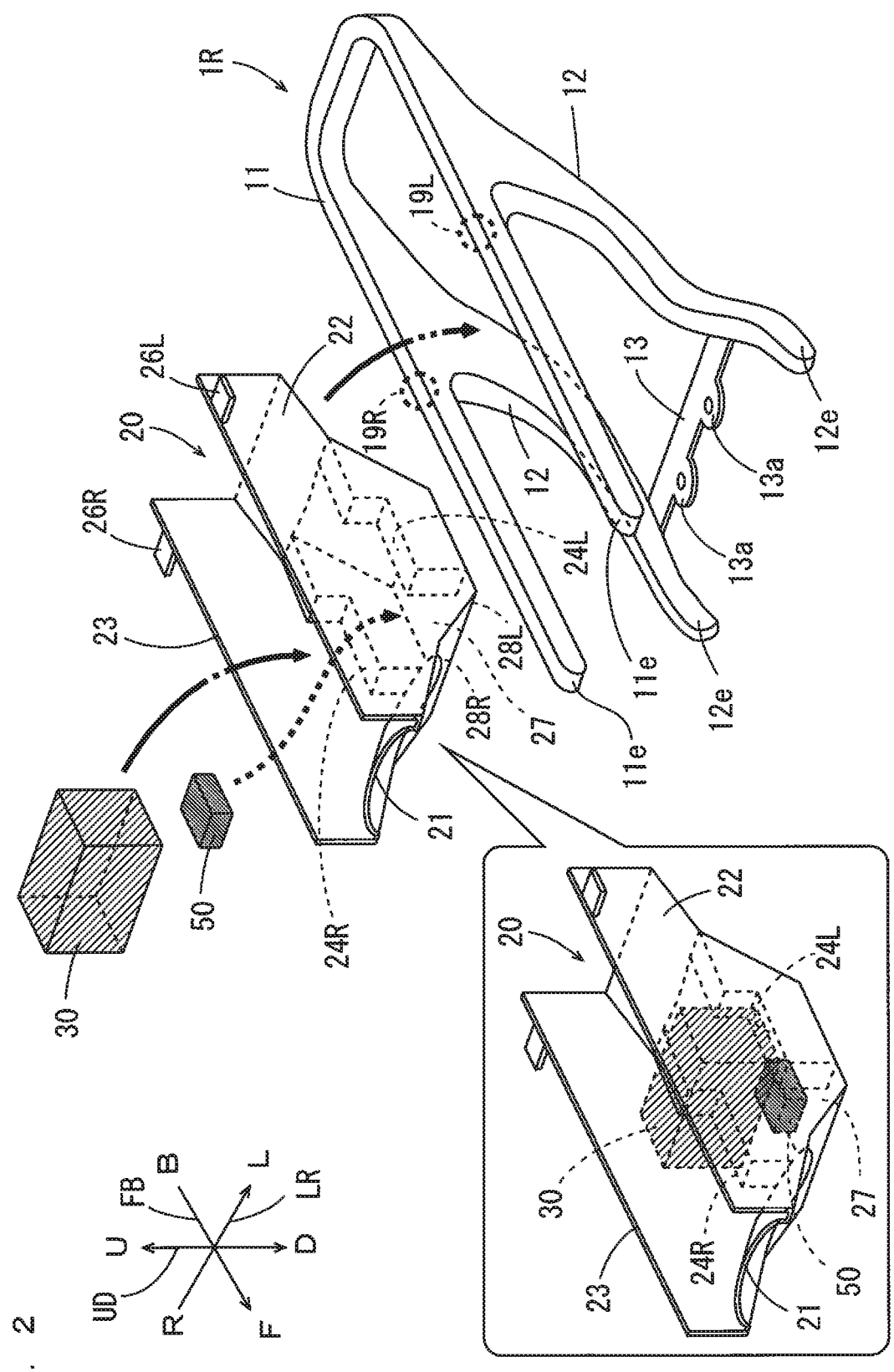
FIG. 2 is a schematic perspective view for explaining the attachment state of an inertial sensor in the motorcycle.
Figure 3:
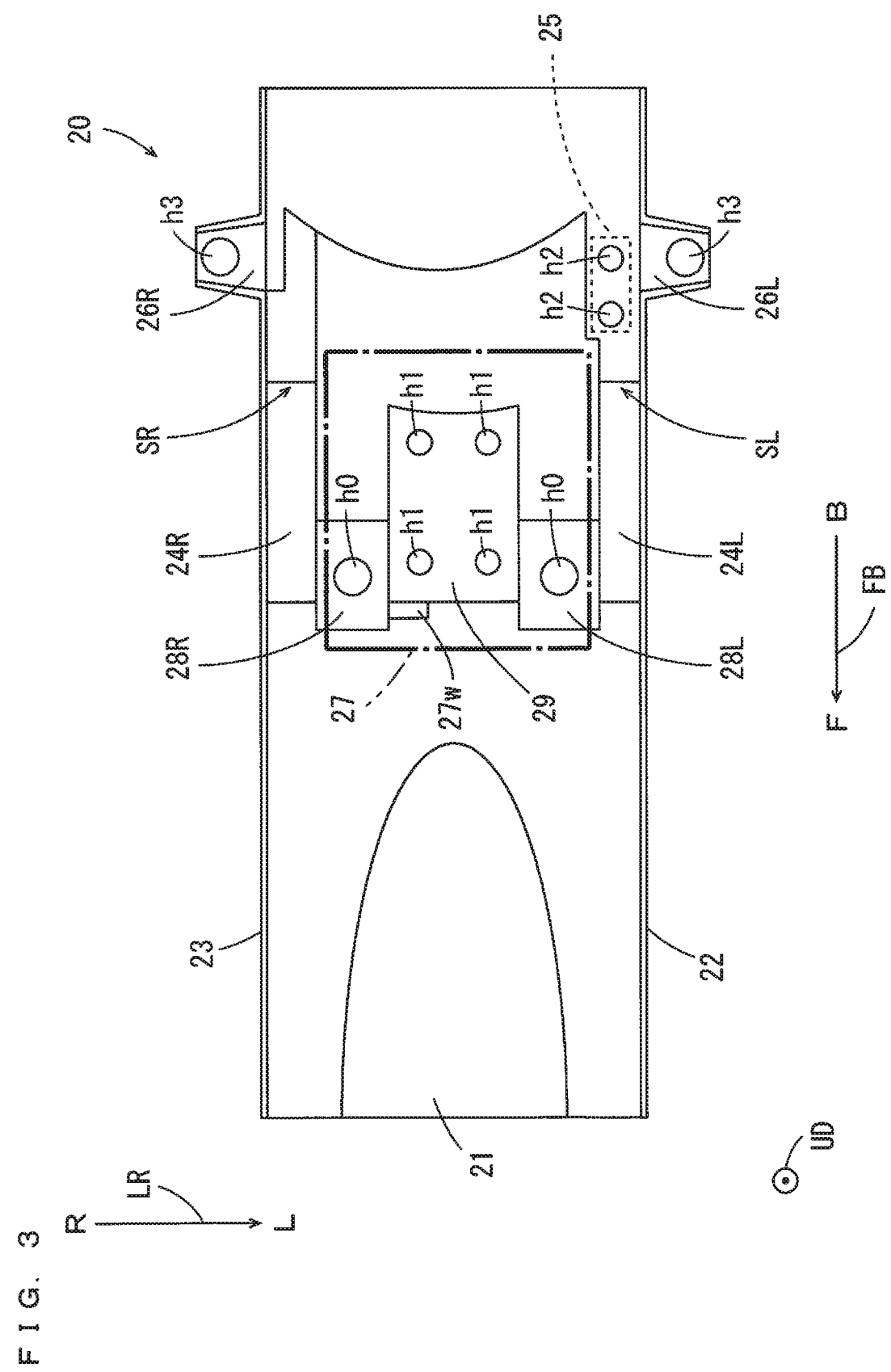
FIG. 3 is a plan view of a battery case of FIG. 2.

FIG. 2 is a schematic perspective view for explaining the attachment state of the inertial sensor 50 in the motorcycle 100, and FIG. 3 is a plan view of the battery case 20 of FIG. 2. In FIG. 2, in order to facilitate understanding of the positional relationship between the battery 30 and the inertial sensor 50, the battery 30 is lightly hatched and the inertial sensor 50 is darkly hatched. In the present embodiment, the battery 30 has a substantially rectangular parallelepiped shape extending in the left-and-right direction LR, and has a relatively large weight (about five kilograms). On the other hand, the inertial sensor 50 has a substantially rectangular parallelepiped shape that is flat in the up-and-down direction UD, and has a sufficiently small weight (about several dozen grams) as compared to the battery 30.

As shown in FIG. 2, the rear frame 1R includes a pair of left and right upper rails 11 and a pair of left and right lower rails 12. The left and right upper rails 11 are formed to be arranged in the left-and-right direction LR and extend in parallel to the front-and-rear direction FB, and their rear ends are connected to each other. On the other hand, the left and right lower rails 12 are formed to extend from the vicinity of the rear ends of the left and right upper rails 11 while being curved downwardly and forwardly. With such a configuration, the rear frame 1R substantially has a U-shape in a plan view.

As indicated by thick dotted lines in FIG. 2, upper fixing portions 19L, 19R are formed in substantially the center portion in the front-and-rear direction FB of the left upper rail 11 and substantially the center portion in the front-and-rear direction FB of the right upper rail 11. Holes into which bolts can be inserted are formed in the upper fixing portions 19L, 19R.

Front ends 11e of the left and right upper rails 11 and front ends 12e of the left and right lower rails 12 are respectively connected to and fixed to the main frame 1M of FIG. 1. The portion of the left lower rail 12 that is located at a position farther rearward than the front end 12e by a certain distance is coupled to the portion of the right lower rail 12 that is located at a position farther rearward than the front end 12e by a certain distance by a metallic strip-shaped coupling plate 13. Two lower fixing portions 13a respectively corresponding to left and right lower fixing portions 28L, 28R (FIG. 3), described below, of the battery case 20 are formed in the strip-shaped coupling plate 13. Holes into which bolts can be inserted are formed in the two lower fixing portions 13a.

As shown in FIGS. 2 and 3, the battery case 20 has a bottom wall 21, a left wall 22 and a right wall 23. The bottom wall 21 has a rectangular shape extending in the front-and-rear direction FB in a plan view of the vehicle. The left wall 22 is formed to extend upwardly from the left edge of the bottom wall 21. The right wall 23 is formed to extend upwardly from the right edge of the bottom wall 21.

The substantially central portion of the bottom wall 21 protrudes farther downwardly than the rest of the bottom wall 21. The substantially central portion of the bottom wall 21 is referred to as a bottom portion 27 of the battery case 20. With such a configuration, the peripheral portion of the bottom portion 27 in the bottom wall 21 functions as a rib for improving the rigidity of the battery case 20. Thus, the battery case 20 has high rigidity despite being formed of resin. In FIG. 3, the bottom portion 27 of the battery case 20 is indicated by a thick one-dot and dash line.

As shown in FIG. 3, two lower fixing portions 28L, 28R, an inertial sensor fixing portion 29 and a wire fixing portion 27w are formed in the bottom portion 27 of the battery case 20. The two lower fixing portions 28L, 28R are formed to be arranged in the left-and-right direction LR to be spaced apart from each other. A through hole h0 is formed in each of the lower fixing portions 28L, 28R. The inertial sensor fixing portion 29 has a flat rectangular upper surface. The upper surface of the inertial sensor fixing portion 29 is used as a fixing surface for fixing the inertial sensor 50. In the inertial sensor fixing portion 29, four through holes h1 are formed.

Further, the front half of the inertial sensor fixing portion 29 is formed to be located between the two lower fixing portions 28L, 28R. The wire fixing portion 27w is formed at a position in the vicinity of the inertial sensor fixing portion 29 and adjacent to the right lower fixing portion 28R of the two lower fixing portions 28L, 28R. Details of the wire fixing portion 27w will be described below.

A battery fixing portion 24L is formed between the left wall 22 and the bottom portion 27 in the bottom wall 21 in the plan view of the vehicle. Further, a battery fixing portion 24R is formed between the right wall 23 and the bottom portion 27 in the bottom wall 21 in the plan view of the vehicle. The battery fixing portions 24L, 24R have flat strip-shaped upper surfaces. The heights of the upper surfaces of the battery fixing portions 24L, 24R in the up-and-down direction UD are equal to each other. Step portions SL, SR are formed at the rear ends of the battery fixing portions 24L, 24R, respectively.

A sheet metal fixing portion 25 is formed rearwardly of the left battery fixing portion 24L in the bottom wall 21 as indicated by a dotted line in FIG. 3. The sheet metal fixing portion 25 has a flat rectangular upper surface. The upper surface of the sheet metal fixing portion 25 is used as a fixing surface for fixing a base sheet metal 230 (FIGS. 7 and 8) described below. Two through holes h2 are formed in the sheet metal fixing portion 25.

An upper fixing portion 26L is formed in the vicinity of the rear end of the left wall 22 so as to project leftwardly from the upper end of the left wall 22 by a certain distance. Further, an upper fixing portion 26R is formed in the vicinity of the rear end of the right wall 23 so as to project rightwardly from the upper end of the right wall 23 by a certain distance. A through hole h3 is formed in each of the upper fixing portions 26L, 26R.

As indicated by a thick two-dots and dash arrow in FIG. 2, when the battery case 20 is attached to the rear frame 1R, the left and right lower fixing portions 28L, 28R of the battery case 20 are respectively connected to the two lower fixing portions 13a of the strip-shaped coupling plate 13 with bolts and nuts. Further, the left and right upper fixing portions 26L, 26R of the battery case 20 are connected to the left and right upper fixing portions 19L, 19R of the rear frame 1R with bolts and nuts, respectively. Thus, the battery case 20 is fixed to the rear frame 1R.

Figure 4:
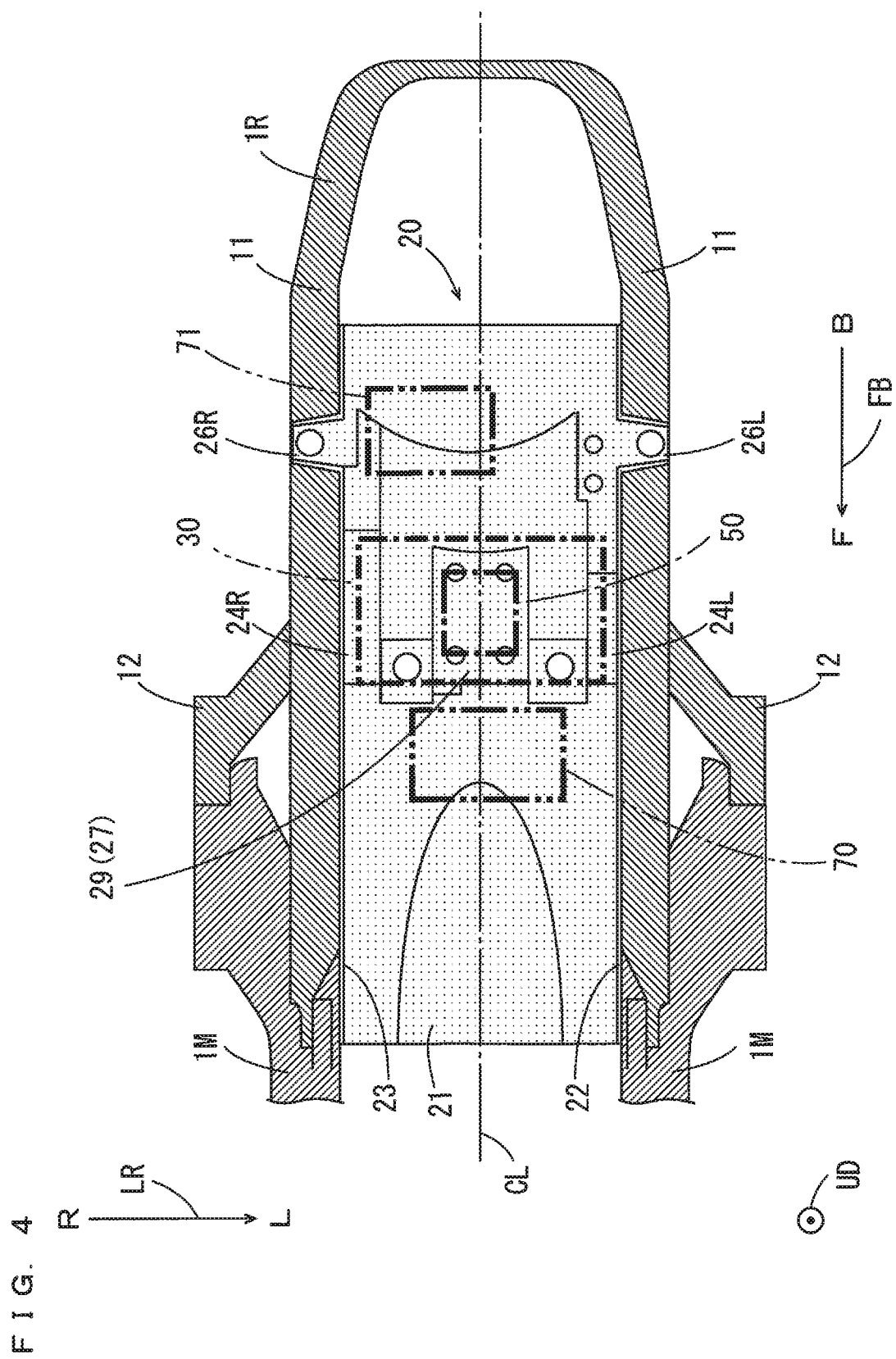
FIG. 4 is a plan view showing the positional relationship among various constituent elements stored in the battery case of FIG. 2.

The inertial sensor 50 has an outer shape that is equal to or smaller than that of the inertial sensor fixing portion 29 of FIG. 4 in a plan view, and is fixed to the bottom portion 27 of the battery case 20 as indicated by a thick dotted arrow in FIG. 2. More specifically, the inertial sensor 50 is fixed to the inertial sensor fixing portion 29 (FIG. 3) of the bottom portion 27.

The dimension of the battery 30 in the longitudinal direction (the left-and-right direction LR in which the battery 30 extends) is larger than the distance between the left and right battery fixing portions 24L, 24R and is smaller than the distance between the left and right walls 22, 23 in FIG. 3.

The battery 30 is fixed in the battery case 20 such that both ends of the battery 30 in the longitudinal direction are respectively supported on the left and right battery fixing portions 24L, 24R as indicated by a thick one-dot and dash arrow in FIG. 2. The inertial sensor 50 and the battery 30 being fixed in the battery case 20 are shown in the balloon in FIG. 2.

FIG. 4 is a plan view showing the positional relationship among various constituent elements stored in the battery case 20 of FIG. 2. In FIG. 4, the main frame 1M and the rear frame 1R are hatched with two types of lines in different directions to facilitate understanding of the connection state among the main frame 1M, the rear frame 1R and the battery case 20. Further, the battery case 20 is indicated by a dotted pattern. Further, in FIG. 4, the battery 30 and the inertial sensor 50 fixed in the battery case 20 are indicated by thick one-dot and dash lines.

As shown in the balloon in FIG. 2, and FIG. 4, the battery 30 is fixed in the vicinity of the fixing portion (the bottom portion 27) of the inertial sensor 50 in the battery case 20 so as to overlap with at least part of the inertial sensor 50 in the plan view of the vehicle. Thus, because the battery 30 has a relatively large weight, even in a case where vibration is transmitted from the body frame 1 to the battery case 20 during traveling of the vehicle, vibration of the bottom portion 27 is suppressed due to the weight of battery 30. The vibration transmitted from the body frame 1 to the battery case 20 during traveling of the vehicle includes vibration generated from the engine 5, vibration generated in the front wheel 3, vibration generated in the rear wheel 7 and the like.

Further, since the above-mentioned battery case 20 is made of resin, the parts other than the bottom portion 27 and its vicinity have a certain degree of flexibility. Therefore, part of the vibration transmitted from the body frame 1 to the battery case 20 during traveling of the vehicle is absorbed by the battery case 20. Therefore, the vibration transmitted to the inertial sensor 50 during traveling of the vehicle is reduced.

Here, the battery 30 of FIG. 4 is fixed to the battery case 20 at a position farther upward than the inertial sensor 50 so as to overlap with the entire inertial sensor 50 in the plan view of the vehicle. With such a configuration, in order to access the inertial sensor 50 from outside of the motorcycle 100, it is necessary to remove the seat 9 and the battery 30 from the body frame 1 in this order. Therefore, in the motorcycle 100 according to the present embodiment, the difficulty in accessing the inertial sensor 50 from outside of the motorcycle 100 is increased. As a result, the theft of the inertial sensor 50 is prevented, and a decrease in measurement accuracy caused by the user carelessly touching the inertial sensor 50 is suppressed.

Further, in the motorcycle 100, the inertial sensor 50 is arranged so as to overlap with a vehicle central axis CL of FIG. 4 that extends in the front-and-rear direction FB in the plan view of the vehicle. In this case, the inertia of the motorcycle 100 is measured more accurately by the inertial sensor 50.

In the present embodiment, the hydraulic unit 70 and an electrical component 71 are fixed in the battery case 20 in addition to the battery 30 and the inertial sensor 50 as indicated by thick two-dots and dash lines in FIG. 4. The hydraulic unit 70 constitutes part of the ABS provided in the motorcycle 100. The electrical component 71 includes a fuse and a connector that constitute part of the electrical system of the motorcycle 100. In this manner, part of a supply system for liquid (such as brake fluid or oil) and part of the electrical system in the motorcycle 100 are stored in the battery case 20 in addition to the battery 30 and the inertial sensor 50.

In the example of FIG. 4, the hydraulic unit 70 has a weight that is sufficiently larger than that of the inertial sensor 50, and is fixed in the battery case 20 so as to be adjacent to the battery 30. Therefore, the members having relatively large weight such as the battery 30 and the hydraulic unit 70 are gathered in the bottom portion 27 and its vicinity in the battery case 20. Thus, the vibration generated in the vicinity of the inertial sensor 50 in the battery case 20 is reduced by the weight of the battery 30 and the hydraulic unit 70. Further, because the hydraulic unit 70 is stored in the battery case 20, an increase in height of the seat 9 caused by provision of the hydraulic unit 70 outside of the battery case 20 is suppressed.

[3] Positional Relationship Among Shock Absorbing Mechanism 80, Rear Wheel 7 and Battery Case 20

Figure 5:
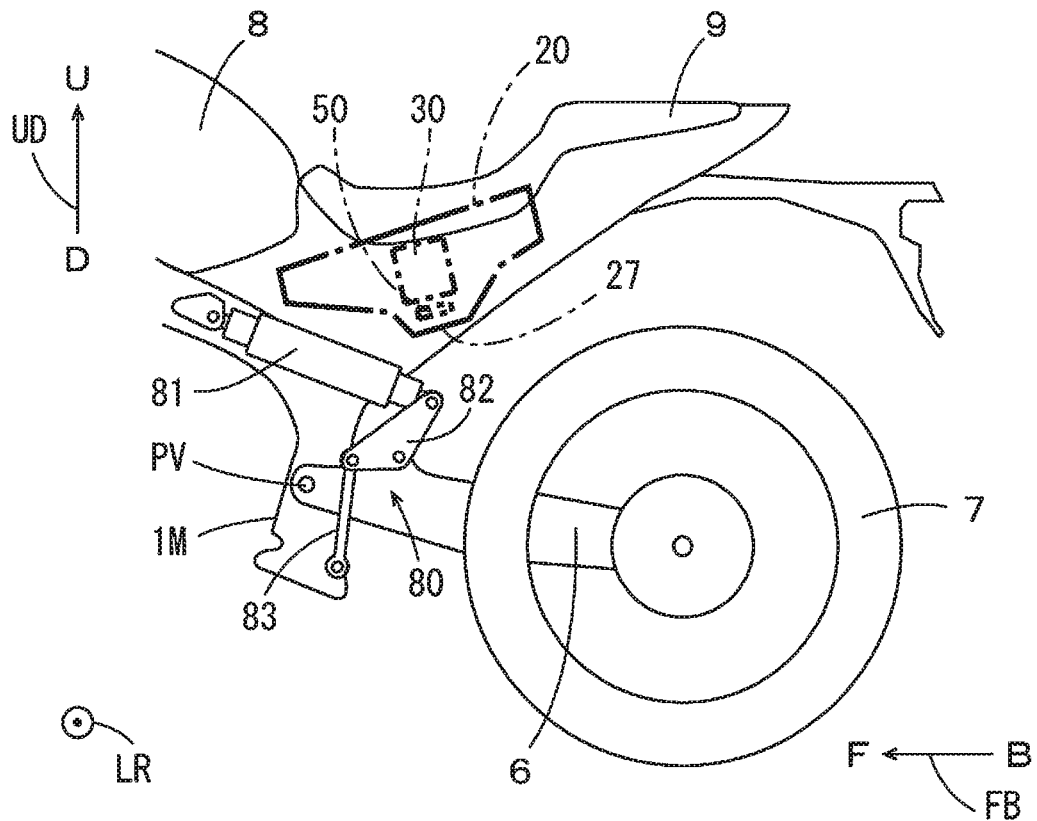
FIG. 5 is a schematic transparent side view of the rear half of the vehicle for explaining the positional relationship between a shock absorbing mechanism and a rear wheel, and the battery case.
Figure 6:
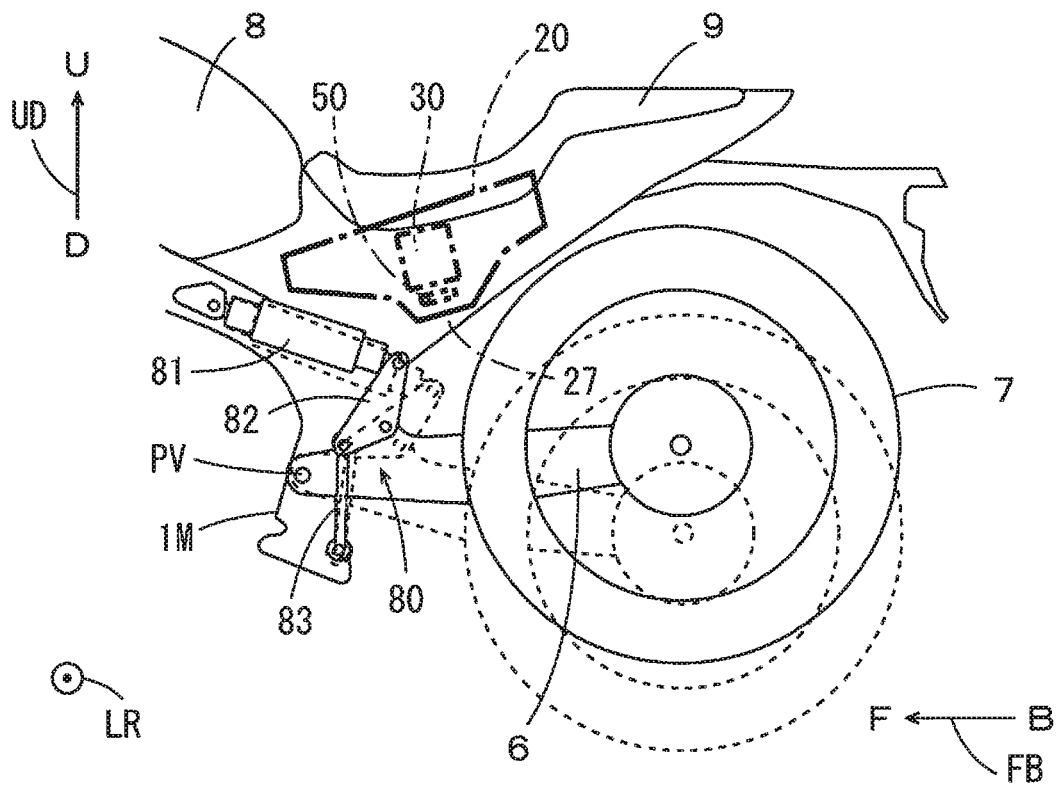
FIG. 6 is a schematic transparent side view of the rear half of the vehicle for explaining the positional relationship between the shock absorbing mechanism and rear wheel, and the battery case.

FIGS. 5 and 6 are schematic transparent side views of the rear half of the vehicle for explaining the positional relationship among the shock absorbing mechanism 80, the rear wheel 7 and the battery case 20. In FIGS. 5 and 6, the battery case 20, the battery 30 and the inertial sensor 50 are indicated by thick one-dot and dash lines. Meanwhile, parts of the structure including the rear arm 6, the shock absorbing mechanism 80 and the rear wheel 7 of the motorcycle 100 are indicated by solid lines.

As shown in FIG. 5, the shock absorbing mechanism 80 includes a rear suspension 81, a first link member 82 and a second link member 83. The rear suspension 81 is provided at a position farther forward than the rear wheel 7 to extend obliquely downwardly toward a position rearward of the vehicle.

The front end of the rear suspension 81 is connected to a portion in the vicinity of the fuel tank 8 in the main frame 1M. The first link member 82 is connected to the rear end of the rear suspension 81. The first link member 82 is further connected to part of the rear arm 6 and connected to the second link member 83. The second link member 83 is further connected to the lower end of the main frame 1M.

In regard to the connection portion between the main frame 1M and the rear suspension 81, the connection portion between the rear suspension 81 and the first link member 82, and the connection portion between the first link member 82 and the rear arm 6, one member and the other member are rotatable relative to each other about an axis parallel to the left-and-right direction LR. Further, in each of the connection portion between the first link member 82 and the second link member 83 and the connection portion between the second link member 83 and the main frame 1M, one member and the other member are rotatable with relative to each other about an axis parallel to the left-and-right direction LR.

With the above-mentioned configuration, part of the rear arm 6 is supported at the main frame 1M via the rear suspension 81 so as to be swingable in the up-and-down direction of the vehicle. Thus, when shock that is generated in the rear wheel 7 is transmitted to the rear suspension 81, the rear suspension 81 absorbs the transmitted shock.

FIG. 5 shows the state of the rear half of the vehicle when shock is not generated in the rear wheel 7, that is, the state of the rear half of the vehicle when the rear suspension 81 is not absorbing shock. In the following description, the state of the vehicle shown in FIG. 5 is referred to as a normal state. On the other hand, FIG. 6 shows the state of the rear half of the vehicle when the rear suspension 81 is most contracted by absorbing the shock generated in the rear wheel 7. In the following description, the state of the vehicle shown in FIG. 6 is referred to as a maximum shock state.

In FIG. 6, the state of the rear arm 6, the shock absorbing mechanism 80 and the rear wheel 7 in the normal state is further indicated by dotted lines. As shown in FIGS. 5 and 6, during traveling of the motorcycle 100, the rear arm 6 and the rear wheel 7 rotate (swing) in the up-and-down direction UD about the pivot shaft PV according to the magnitude of the shock generated between the road surface and the rear wheel 7.

Here, the battery case 20 is provided not to overlap with the rear suspension 81 and the rear wheel 7 in a side view of the vehicle when the motorcycle 100 is in the maximum shock state. Further, the battery case 20 is provided such that the bottom portion 27 projects toward a position between the rear suspension 81 and the rear wheel 7 in the front-and-rear direction FB in the side view of the vehicle.

With the above-mentioned configuration, the inertial sensor 50 is fixed to the bottom portion 27 of the battery case 20 so as to be located in a dead space outside of the range of motion of the rear suspension 81 and the range of motion of the rear wheel 7 in the side view of the vehicle. Thus, the dead space in the motorcycle 100 is effectively utilized as a space in which the inertial sensor 50 is provided. Therefore, the inertial sensor 50 can be arranged in the battery case 20 without an increase in height of the seat 9.

[4] Details of Fixed State of Battery 30 and Inertial Sensor 50

Figure 7:
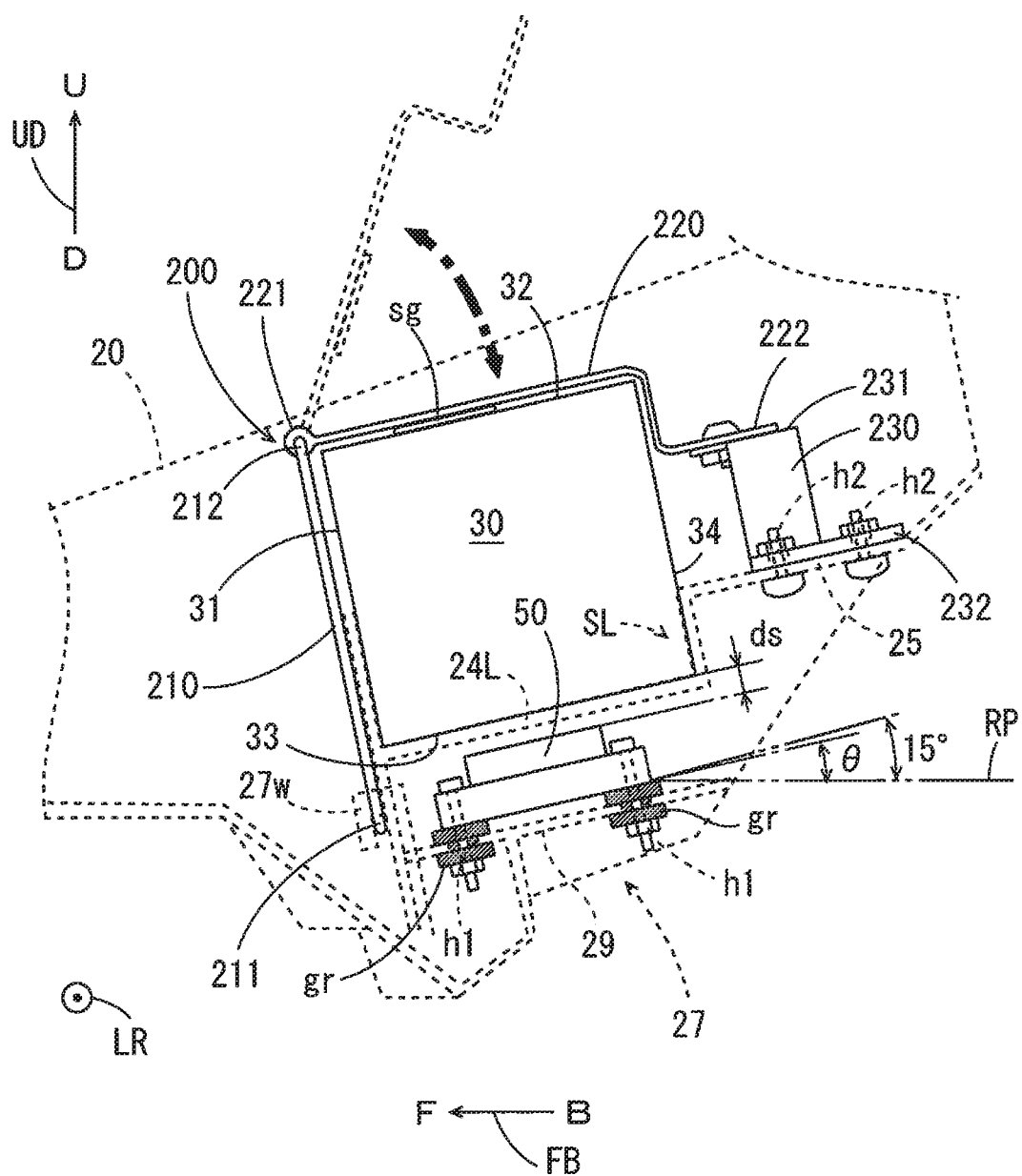
FIG. 7 is a schematic transparent side view for explaining the details of the state of a battery and an inertial sensor being fixed in the battery case.
Figure 8:
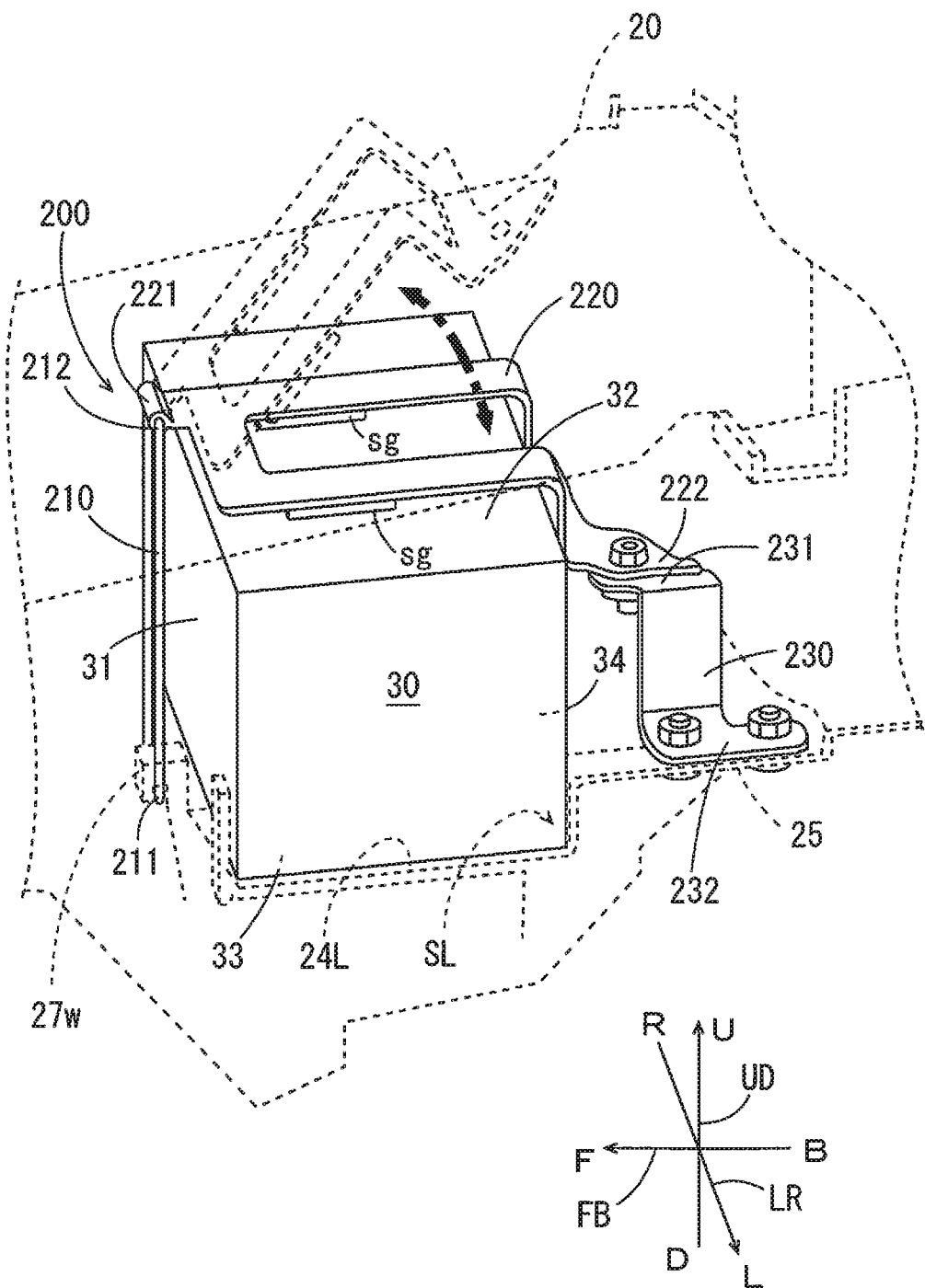
FIG. 8 is a schematic transparent perspective view for explaining the details of the state of the battery and the inertial sensor being fixed in the battery case.

FIG. 7 is a schematic transparent side view for explaining the details of the fixed state of the battery 30 and the inertial sensor 50 in the battery case 20. FIG. 8 is a schematic transparent perspective view for explaining the details of the fixed state of the battery 30 and the inertial sensor 50 in the battery case 20. In FIGS. 7 and 8, the shape of part of the battery case 20 is indicated by dotted lines.

As shown in FIG. 7, rubber grommets gr are fitted into the four through holes h1 (FIG. 3) of the inertial sensor fixing portion 29 at the bottom portion 27 of the battery case 20. In FIG. 7, the grommets gr are hatched. The inertial sensor 50 is connected to the inertial sensor fixing portion 29 via the four grommets gr with four bolts and four nuts. In this manner, because the inertial sensor 50 is fixed to the inertial sensor fixing portion 29 via the plurality of grommets gr, transmission of the vibration generated in the battery case 20 during traveling of the vehicle to the inertial sensor 50 is suppressed. Thus, the inertia of the motorcycle 100 can be measured with high accuracy.

In the battery case 20, a metallic fixing mechanism 200 configured to be capable of fixing the battery 30 in the battery case 20 and detaching the battery 30 from the battery case 20 is provided. As shown in FIGS. 7 and 8, the fixing mechanism 200 includes a first fixing member 210, a second fixing member 220 and a base sheet metal 230.

In the present embodiment, a bending process is performed on one piece of hard wire, and one end and the other end of the wire are connected to each other, for example, whereby the first fixing member 210 is fabricated. The first fixing member 210 of the present example is formed so as to delineate a strip having a certain width and extending in one direction. The first fixing member 210 has a first end 211 and a second end 212.

A punching process, a bending process and the like are performed on one piece of sheet metal, for example, whereby each of the second fixing member 220 and the base sheet metal 230 are fabricated. The second fixing member 220 has a third end 221 and a fourth end 222. The base sheet metal 230 has a fifth end 231 and a sixth end 232.

The first end 211 of the first fixing member 210 is connected to the wire fixing portion 27w of the battery case 20. The second end 212 of the first fixing member 210 is connected to the third end 221 of the second fixing member 220. Here, the connection portion between the second end 212 and the third end 221 forms a hinge. Thus, the second fixing member 220 is rotatable about an axis parallel to the left-and-right direction LR through the second end 212 of the first fixing member 210.

The sixth end 232 of the base sheet metal 230 is fixed to the sheet metal fixing portion 25 with a bolt. In this state, the fifth end 231 of the base sheet metal 230 is located above the sheet metal fixing portion 25.

The second fixing member 220 rotates about the second end 212 of the first fixing member 210, whereby the fourth end 222 of the second fixing member 220 and the fifth end 231 of the base sheet metal 230 come into contact with each other or move away from each other. Further, the fourth end 222 and the fifth end 231 are configured to be connectable to each other with bolts and nuts while being in contact with each other.

Here, the battery 30 has a first surface 31 that faces mainly forwardly in the battery case 20 and a second surface 32 that mainly faces upwardly in the battery case 20. Further, the battery 30 has a third surface 33 that mainly faces downwardly in the battery case 20, and a fourth surface 34 that mainly faces rearwardly in the battery case 20.

When fixing the battery 30 in the battery case 20, the battery 30 is placed on the left and right battery fixing portions 24L, 24R (FIG. 3). At this time, part of the third surface 33 abuts against the battery fixing portions 24L, 24R, and part of the fourth surface 34 abuts against the left and right steps SL, SR (FIG. 3), whereby the battery 30 is temporarily positioned in the battery case 20. Further, the first fixing member 210 extends upwardly from the wire fixing portion 27w along the first surface 31 of the battery 30.

In this state, the second fixing member 220 rotates about the second end 212 of the first fixing member 210, thereby being able to be in close proximity to or spaced apart from the second surface 32 of the battery 30 as indicated by the thick one-dot and dash arrow in FIGS. 7 and 8.

Rubber shock buffering members sg are provided on part of the second fixing member 220 so as to come into contact with the second surface 32 due to the second fixing member 220 being in close proximity to the second surface 32. With the second fixing member 220 supported on the second surface 32 of the battery 30 via the shock buffering members sg, the fourth end 222 of the second fixing member 220 overlaps with the fifth end 231 of the base sheet metal 230. As such, the fourth end 222 and the fifth end 231 are connected to each other with a bolt and a nut, whereby the battery 30 is fixed in the vicinity of the bottom portion 27 in the battery case 20.

On the other hand, when the battery 30 is removed from the battery case 20, the bolt and nut connecting the fourth end 222 to the fifth end 231 are detached. Thus, it is possible to remove the battery 30 from the battery case 20 by detaching the second fixing member 220 from the second surface 32 of the battery 30.

With the above-mentioned configuration, the battery 30 can be easily and firmly fixed in the battery case 20 by the fixing mechanism 200. Thus, generation of vibration in the bottom portion 27 of the battery case 20 due to the movement of the battery 30 with respect to the battery case 20 during traveling of the vehicle is suppressed. As a result, the inertia of the motorcycle 100 can be measured by the inertial sensor 50 with high accuracy. Further, the battery 30 fixed to the battery case 20 can be easily removed. Therefore, the battery 30 can be easily replaced.

The inertial sensor 50 according to the present embodiment has a flat attachment surface for attaching the inertial sensor 50 to the upper surface of the inertial sensor fixing portion 29. In the present embodiment, as shown in FIG. 7, the inertial sensor 50 is fixed in the battery case 20 such that the angle (inclined angle) θ formed by the attachment surface of the inertial sensor 50 and a horizontal plane RP does not exceed 15°. In this manner, because the inertial sensor 50 is not inclined with respect to the horizontal plane RP by more than 15°, the inertia of the motorcycle 100 can be measured with high accuracy. In order to measure the inertia of the motorcycle 100 with higher accuracy, it is preferable that the angle θ formed by the attachment surface of the inertial sensor 50 and the horizontal plane RP is equal to or smaller than 12°.

As shown in FIG. 7, the inertial sensor fixing portion 29 and the battery fixing portions 24L, 24R are formed such that the distance ds between the battery 30 and the inertial sensor 50 is smaller than half of the thickness of the battery 30 in the up-and-down direction UD. In this case, the distance between the inertial sensor fixing portion 29 and each of the battery fixing portions 24L, 24R is sufficiently small, so that the vibration of the inertial sensor 50 is more easily suppressed by the weight of the battery 30.

[5] Details of Fixed State of Battery Case 20 to Rear Frame 1R

Figure 9:
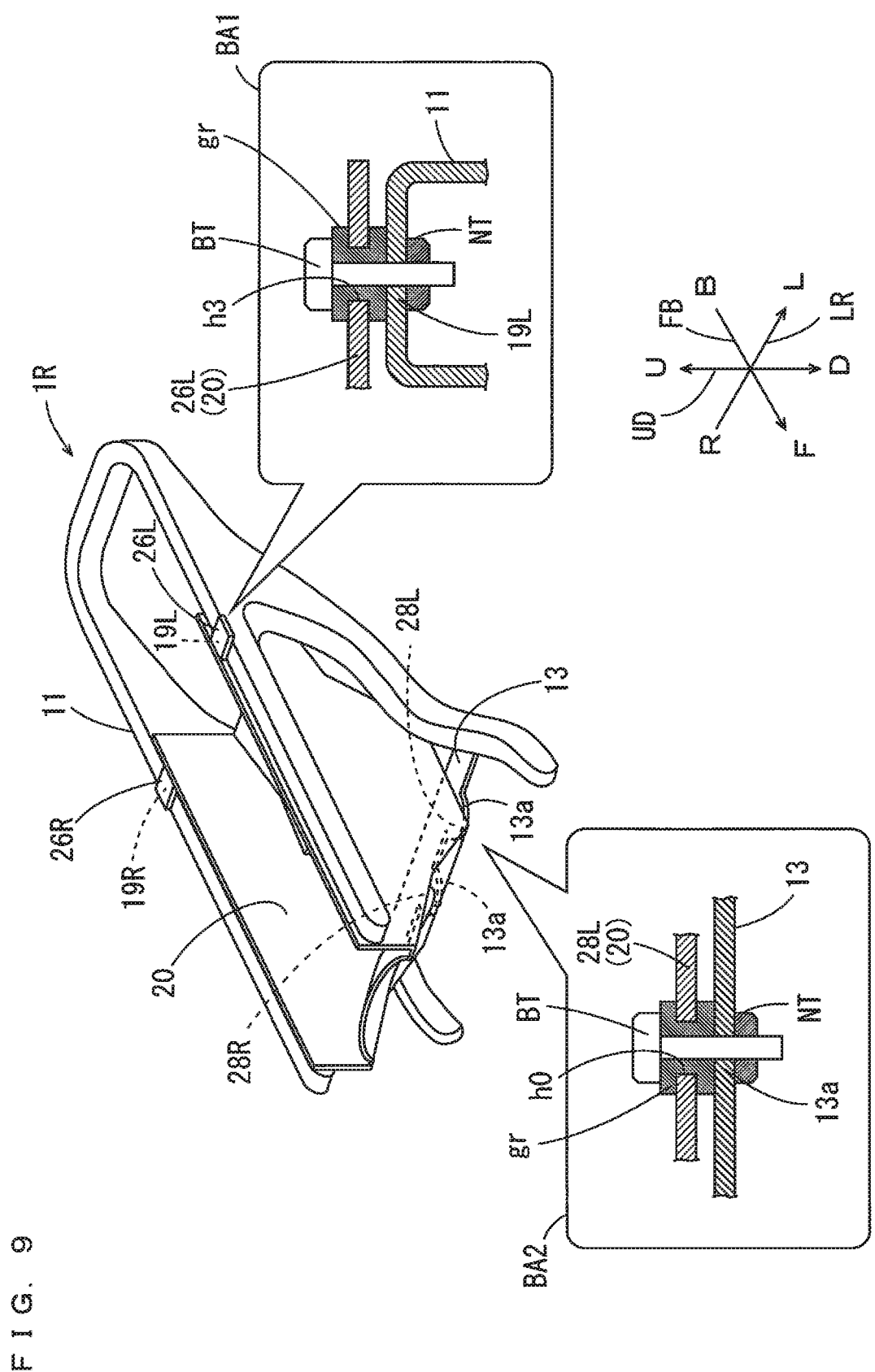
FIG. 9 is a perspective view and a partial cross sectional view for explaining the details of the state of the battery case being fixed to a rear frame.

FIG. 9 shows a perspective view and partial cross-sectional views for explaining the details of the fixed state of the battery case 20 to the rear frame 1R. In FIG. 9, an external perspective view shows the battery case 20 being fixed to the rear frame 1R. Further, in FIG. 9, the cross section of the connection portion between the upper fixing portion 26L of the battery case 20 and the upper fixing portion 19L of the rear frame 1R is shown in the balloon BA1. Further, the cross section of the connection portion between the lower fixing portion 28L of the battery case 20 and the left lower fixing portion 13a of the strip-shaped coupling plate 13 is shown in the balloon BA2.

As shown in the balloon BA1 in FIG. 9, a grommet gr is fitted into the through hole h3 in the upper fixing portion 26L of the battery case 20. Thus, the upper fixing portion 26L of the battery case 20 is positioned on the upper fixing portion 19L of the rear frame 1R via the grommet gr. In this state, the upper fixing portion 26L of the battery case 20 and the upper fixing portion 19L of the rear frame 1R are connected to each other with a bolt BT and a nut NT. The structure of the connection portion between the upper fixing portion 26R of the battery case 20 and the upper fixing portion 19R of the rear frame 1R is the same as that of the connection portion between the upper fixing portion 26L of the battery case 20 and the upper fixing portion 19L of the rear frame 1R.

As shown in the balloon BA2 in FIG. 9, a grommet gr is fitted into the through hole h0 in the lower fixing portion 28L of the battery case 20. Thus, the lower fixing portion 28L of the battery case 20 is positioned on the left lower fixing portion 13a of the strip-shaped coupling plate 13 via the grommet gr. In this state, the lower fixing portion 28L of the battery case 20 and the left lower fixing portion 13a of the strip-shaped coupling plate 13 are connected to each other with a bolt BT and a nut NT. The structure of the connection portion between the lower fixing portion 28R of the battery case 20 and the right lower fixing portion 13a of the strip-shaped coupling plate 13 is the same as that of the connection portion between the lower fixing portion 28L of the battery case 20 and the left lower fixing portion 13a of the strip-shaped coupling plate 13.

With the above-mentioned configuration, because the battery case 20 is fixed to the rear frame 1R via the plurality of grommets gr, transmission of vibration generated in the rear frame 1R during traveling of the vehicle to the battery case 20 is suppressed. Thus, the inertia of the motorcycle 100 can be measured with higher accuracy.

[6] Effects

In the above-described motorcycle 100, the inertial sensor 50 is fixed to the bottom portion 27 of the battery case 20. Thus, the dead space that is outside of the range of motion of the rear suspension 81 with respect to the body frame 1 and the range of motion of the rear wheel 7 is effectively used as an installation space for the inertial sensor 50. Therefore, the inertial sensor 50 can be arranged in the battery case 20 without an increase in height of the seat 9.

Further, with the above-mentioned configuration, the battery 30 is fixed to the battery case 20 at a position above the inertial sensor 50 so as to overlap with the inertial sensor 50 in the plan view of the vehicle. In this case, the portion to which the battery 30 is attached is in close proximity to the portion to which the inertial sensor 50 is attached in the battery case 20. Thus, even in a case where vibration is transmitted from the body frame 1 to the battery case 20 during traveling of the vehicle, vibration of the bottom portion 27 of the battery case 20 is suppressed by the weight of the battery 30. Further, since being made of resin, the above-mentioned battery case 20 absorbs part of the vibration transmitted from the body frame 1. Therefore, the vibration generated in the inertial sensor 50 is reduced.

Further, with the above-mentioned configuration, the inertial sensor 50 is fixed to the inertial sensor fixing portion 29 of the battery case 20. Further, the battery 30 and the seat 9 are present above the inertial sensor 50. Thus, the difficulty in accessing the inertial sensor 50 from outside of motorcycle 100 is increased. Further, because the inertial sensor 50 is provided inside of the battery case 20, splashed rainwater or scattered dust outside of the motorcycle 100 during traveling of the vehicle is prevented from adhering to the inertial sensor 50.

As a result, an increase in size of the vehicle due to provision of the inertial sensor 50 is suppressed while high detection accuracy of inertia by the inertial sensor 50 is maintained.

[7] Other Embodiments (a) While the inertial sensor 50 is fixed to the battery case 20 via the plurality of grommets gr in the above-mentioned embodiment, the present invention is not limited to this. The inertial sensor 50 may be directly fixed to the battery case 20.

(b) While the battery case 20 is fixed to the rear frame 1R via the plurality of grommets gr in the above-mentioned embodiment, the present invention is not limited to this. The battery case 20 may be directly fixed to the rear frame 1R.

(c) While the battery 30 is fixed to the battery case 20 with use of the metallic fixing mechanism 200 in the above-mentioned embodiment, the present invention is not limited to this. The battery 30 may be fixed to the battery case 20 with a strip-shaped member made of cloth or rubber, or the like. Alternatively, the battery 30 may be directly fixed to the battery case 20 with a bolt.

(d) While the hydraulic unit 70 is fixed in the battery case 20 so as to be adjacent to the battery 30 in the front-and-rear direction FB in the above-mentioned embodiment, the present invention is not limited to this. The hydraulic unit 70 may be fixed in the battery case 20 so as to be adjacent to the battery 30 in the left-and-right direction LR.

(e) While the hydraulic unit 70 is fixed in the battery case 20 in the above-mentioned embodiment, the hydraulic unit 70 may be provided outside of the battery case 20.

(f) The degree to which the rear suspension 81 is inclined with respect to the horizontal plane is not limited to the examples of FIGS. 5 and 6 in the above-mentioned embodiment. The rear suspension 81 may be provided at a position farther forward than the rear wheel 7 to extend obliquely downwardly toward a position rearward of the vehicle. Therefore, the rear suspension 81 may be provided such that the angle between the direction in which the rear suspension 81 extends and the horizontal plane is smaller than those of the examples of FIGS. 5 and 6. Alternatively, the rear suspension 81 may be provided such that the angle between the direction in which the rear suspension 81 extends and the horizontal plane is larger than those of the examples of FIGS. 5 and 6.

(g) While the above-mentioned embodiment is an example in which the present invention is applied to the motorcycle, the present invention is not limited to this. The present invention may be applied to another straddled vehicle such as a four-wheeled automobile, a motor tricycle or an ATV (All Terrain Vehicle).

[8] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the body frame 1, the main frame 1M and the rear frame R1 are examples of a body frame, the seat 9 is an example of a seat, the battery 30 is an example of a battery, the inertial sensor 50 is an example of an inertia measurement device, the battery case 20 is an example of a battery case, the rear arm 6 is an example of a rear arm, the rear wheel 7 is an example of a drive wheel, the rear suspension 81 is an example of a rear suspension, the bottom portion 27 of the battery case 20 is an example of a bottom portion of a battery case.

Further, the motorcycle 100 is an example of a straddled vehicle, the hydraulic unit 70 is an example of a hydraulic unit, the grommet gr is an example of first and second shock buffering members, the vehicle central axis CL of FIG. 4 is an example of a vehicle central axis, the fixing mechanism 200 is an example of a fixing mechanism, the first surface 31 of the battery 30 is an example of a first surface, and the second surface 32 of the battery 30 is an example of a second surface.

Further, the first end 211 is an example of a first end, the second end 212 is an example of a second end, the first fixing member 210 is an example of a first fixing member, the third end 221 is an example of a third end, the fourth end 222 is an example of a fourth end, the second fixing member 220 is an example of a second fixing member, the hydraulic unit 70 is an example of an operating element, and the ECU 60 is an example of a controller.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddled vehicle, comprising:
   a body frame;
   a seat that is arranged above the body frame and is supported by the body frame;
   a battery;
   an inertial measurement unit;
   a resin battery case that stores the battery and the inertial measurement unit, and is fixed to the body frame to be located below the seat;
   a rear arm extending rearwardly from the body frame;
   a drive wheel rotatably supported by the rear arm; and
   a rear suspension that is provided at a position farther forward of the vehicle than is the drive wheel in such a way as to extend obliquely downward of the vehicle and toward the drive wheel, and supports the rear arm to be swingable in an up-and-down direction of the vehicle with respect to the body frame, wherein
   the battery case has a bottom portion that protrudes toward a position between the rear suspension and the drive wheel so that the bottom portion is located in a space other than a space in which the rear suspension and the drive wheel are positioned when the rear suspension is in a most contracted state due to absorbance of shock,
   the inertial measurement unit is fixed to the bottom portion of the battery case, and the battery is fixed to the battery case at an upper side of the inertial measurement unit with respect to the up-and-down direction of the vehicle, at least the battery and the inertial measurement unit partially overlapping each other in a plan view of the vehicle.

2. The straddled vehicle according to claim 1, wherein the inertial measurement unit entirely overlaps the battery in the plan view of the vehicle.

3. The straddled vehicle according to claim 1, wherein a distance between the battery and the inertial measurement unit is smaller than half a thickness of the battery in the up-and-down direction.

4. The straddled vehicle according to claim 1, further comprising a hydraulic unit that is stored in the battery case and is fixed to the battery case to be adjacent to the battery.

5. The straddled vehicle according to claim 1, further comprising a first shock buffering member for fixing the inertial measurement unit to the bottom portion of the battery case.

6. The straddled vehicle according to claim 1, further comprising a second shock buffering member for fixing the battery case to the body frame.

7. The straddled vehicle according to claim 1, wherein the inertial measurement unit is positioned along a central axis of the vehicle extending in a front-and-rear direction of the vehicle in the plan view of the vehicle.

8. The straddled vehicle according to claim 1, wherein the inertial measurement unit has a flat attachment surface to be fixed to the battery case, an inclined angle formed between the flat attachment surface and a horizontal plane being less than 15° with the vehicle standing in a direction orthogonal to the horizontal plane.

9. The straddled vehicle according to claim 1, further comprising a metallic fixing mechanism fixed to the battery case, the metallic fixing mechanism detachably fixing the battery to the battery case.

10. The straddled vehicle according to claim 9, wherein the battery has a first surface and a second surface that are adjacent to each other,
the fixing mechanism includes
a first fixing member having a first end and a second end, and
a second fixing member having a third end and a fourth end,
the second end of the first fixing member is connected to the third end of the second fixing member by a hinge,
the first end of the first fixing member is attached to the battery case such that the first fixing member extends along the first surface of the battery,
the second fixing member is provided to be able to become close to and move away from the second surface of the battery by rotating with respect to the first fixing member with use of the hinge, and
the fourth end of the second fixing member is configured to be detachably fix to the battery case with the second fixing member in close proximity to the second surface of the battery.

11. The straddled vehicle according to claim 9, wherein the battery has a first surface and a second surface that are adjacent to each other,
the fixing mechanism includes
a first fixing member having a first end and a second end, and extending in a direction parallel to the first surface of the battery, the first end being attached to the battery case,
a second fixing member having a third end and a fourth end,
a hinge connecting the second end of the first fixing member to the third end of the second fixing member, and
the second fixing member is rotatably provided with respect to the first fixing member by the hinge so that the second fixing member is configured to detachably fix the battery together with the fourth end, by rotating toward the second surface of the battery.

12. The straddled vehicle according to claim 1, further comprising:
an operation element that performs an operation of the vehicle; and
a controller that controls the operation element based on a result of inertial measurement of the vehicle by the inertial measurement unit.

* * * * *